United States Patent
Kuroyanagi et al.

(10) Patent No.: US 6,806,614 B2
(45) Date of Patent: Oct. 19, 2004

(54) CORE WITH INSULATION MEMBER, AND METHOD OF PRODUCING THE SAME

(75) Inventors: Tooru Kuroyanagi, Anjo (JP); Tsuyoshi Yamaguchi, Anjo (JP)

(73) Assignee: Aisin AW Co., Ltd., Anjo (JP)

(*) Notice: Subject to any disclaimer, the term of this patent is extended or adjusted under 35 U.S.C. 154(b) by 0 days.

(21) Appl. No.: 10/466,751

(22) PCT Filed: Sep. 20, 2002

(86) PCT No.: PCT/JP02/09689
§ 371 (c)(1),
(2), (4) Date: Jul. 21, 2003

(87) PCT Pub. No.: WO03/028188
PCT Pub. Date: Apr. 3, 2003

(65) Prior Publication Data
US 2004/0046477 A1 Mar. 11, 2004

(30) Foreign Application Priority Data
Sep. 21, 2001 (JP) .................. 2001-289779

(51) Int. Cl.$^7$ ............................ H02K 3/34
(52) U.S. Cl. .............. 310/215; 310/214; 310/216
(58) Field of Search .................. 310/214–218; 29/596–598

(56) References Cited

U.S. PATENT DOCUMENTS

| | | | | |
|---|---|---|---|---|
| 5,034,643 A | * | 7/1991 | Trian | 310/215 |
| 6,072,259 A | * | 6/2000 | Kawabata et al. | 310/216 |
| 6,633,102 B2 | * | 10/2003 | Nagai et al. | 310/215 |
| 6,744,168 B2 | * | 6/2004 | Fukuda et al. | 310/215 |

FOREIGN PATENT DOCUMENTS

| | | |
|---|---|---|
| JP | 9-93880 A | 4/1997 |
| JP | 9-93881 A | 4/1997 |
| JP | A 2000-78778 | 3/2000 |
| JP | A 2000-125524 | 4/2000 |
| JP | 2001-155939 A | 6/2001 |

* cited by examiner

Primary Examiner—Thanh Lam
(74) Attorney, Agent, or Firm—Oliff & Berridge, PLC

(57) ABSTRACT

A core provided with an insulating member, including the core having a plurality of slots, each slot formed between two teeth protruding from a yoke and having a side face and a bottom face that are formed in a generally flat shape; and the insulating member having a slot portion covering the slot and a core end face portion covering an end face of the core; wherein a core side face of the slot portion is formed in contact with the side face and the bottom face of one of the plurality purality of slots, a coil side face of the slot portion having two side portions and a bottom portion that are formed in a generally flat shape, and the slot portion of the insulating member has a thick portion in at least one portion that is thicker than other portions.

15 Claims, 8 Drawing Sheets

FIG. 1(a)
FIG. 1(b)
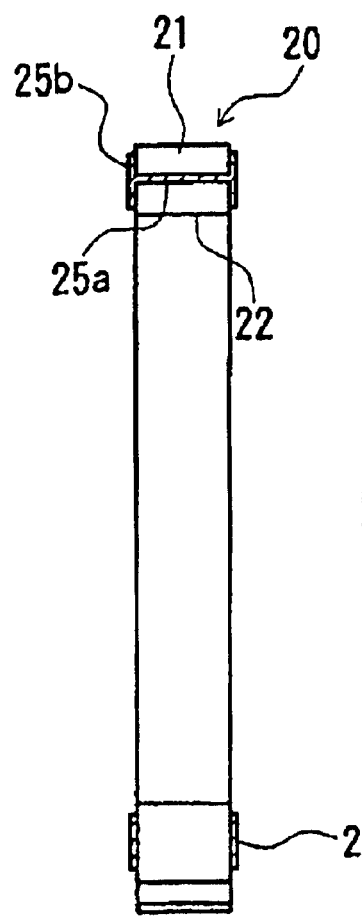
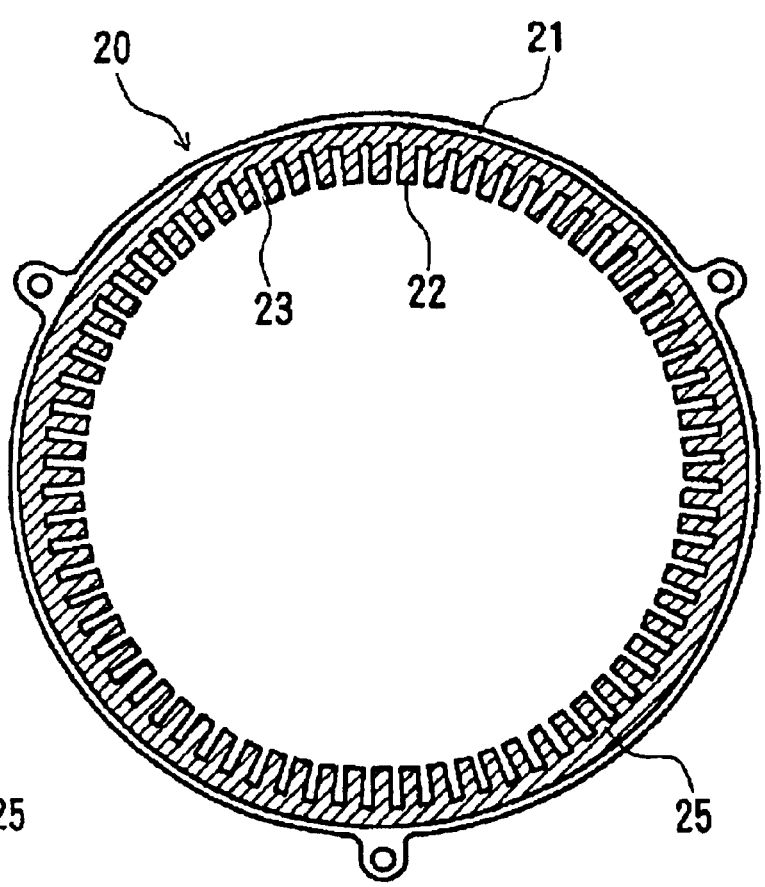

CORE WITH INSULATION MEMBER, AND METHOD OF PRODUCING THE SAME

BACKGROUND OF THE INVENTION

1. Field of Invention

The present invention relates to a core, provided with an insulating member. More specifically, the present invention relates to a core insulating member which is integrally molded by synthetic resin.

2. Description of Related Art

Generally, an electric rotating machine, such as an induction motor and a DC motor (including a generator), is widely used as, for example, a power source in industry, vehicles, and other areas.

In the conventional electric rotating machine, as shown in FIGS. 8(a) and 8(b), a distributed-winding stator 11 includes a core 12, a coil 13, and a core insulating member 17. The core 12 includes a yoke 14, a multitude of teeth 15 that protrude from the yoke 14, and a multitude of slots 16 formed between the teeth 15. The opening portion of the slots 16 are narrower than an inner portion (a depth side). The coil 13 is provided in the slot 16.

The coil 13 and the core 12 are insulated by the core insulating member 17 made of insulating paper having a U-shaped cross section. The core insulating member 17 is fixed in the slot 16 of the core 12, and interposed between an inner surface of the slot 16 and the coil 13, thereby insulating the inner surface of the slot 16 and the coil 13. Furthermore, the core insulating member 17 has cuffs 18 at both ends that are folded back and protrude in a brim configuration. An end of the cuff 18 is in contact with a side face 12a of the core 12 that consists of a side face 15a of the tooth 15 and a side face 14a of the yoke 14, and the coil 13 is held above the side face 12a of the core 12 so as to create a creeping distance 1, thereby securing insulation between the core side face 12a and the coil 13.

However, according to such a conventional insulation structure, the folded-back cuff 18 lengthens an axial length of the stator 11 (lateral length in FIG. 8(b)). Therefore, particularly when an electric motor (electric rotating machine) is used as a drive source of a vehicle such as a hybrid vehicle, the axial length of the stator 11 contributes to a vehicle mounting problem. Accordingly, it is preferable that the insulating member is made attachable to the core side face, thereby reducing the axial length of the stator 11.

Maximum output of the electric motor for driving a vehicle such as a hybrid vehicle in a limited space is required, and therefore, an increase in the space factor of a magnet wire in the slot is also required. Accordingly, in addition to attaching the insulating member to the core side face, forming (molding) the insulating member by synthetic resin can be considered.

Conventionally, examples of the core insulating member as described above include those disclosed in Japanese Patent Laid-Open Publication No. 2000-78778 and Japanese Patent Laid-Open Publication No. 2000-125524.

SUMMARY OF THE INVENTION

According to Japanese Patent Laid-Open Publication No. 2000-78778, the yoke and the teeth are constituted separately. After the teeth are fitted with coils, the teeth with fitted coils are attached to the yoke. Then, with the assembly framed by a core and a base plate, liquid resin molding material is poured or injected between the coil and the teeth, so that all teeth with fitted coils and the yoke are fixed and intergrated by electric insulating resin. In this case, a groove portion is formed in a longitudinal direction on both peripheral side faces of the coil-fitted portion of the teeth, and resin is appropriately poured between the coil and the teeth through the groove portion.

According to Japanese Patent Laid-Open Publication No. 2000-125524, an insulating layer covering die is formed by a stator core in which a multitude of silicon steel plates are laminated, a core die block with an outer shape to be inserted into a slot of the stator core, a movable die block, a positioning die block, and a fixed die block. Resin is injected into the insulating layer covering die to integrally mold a resin insulating layer. In this case, a die block supporting portion corresponding to the center of the teeth of the stator core is provided, and the stator core is supported by the supporting portion so as to secure a uniform clearance between the die block and an end face of the stator core. Accordingly, the thickness of the resin is made uniform and a non-resin filled portion is eliminated so that the thickness of the insulating layer can be made thin.

According to Japanese Patent Laid-Open Publication No. 2000-78778, coils are fitted to the teeth in a state separate from the yoke; the insulating resin is poured between the coils, the teeth, and the yoke; and the teeth with fitted coils are attached to the yoke. Such a method is not applicable to a structure formed by fitting an insulating member to a core that has the teeth and the yoke integrally formed, before winding the coil around the core. In addition, according to the related art, it is difficult to integrally mold the insulating member on the core end face. Furthermore, according to the related art, the groove portion for securing the flow of resin is formed on both peripheral side faces of the tooth. However, the groove portion reduces the cross-sectional area of the tooth, serving as a magnetic flux path, thereby possibly lowering efficiency.

Meanwhile, according to Japanese Patent Laid-Open Publication No. 2000-125524, with the stator core being used as a part of the die, a thin insulating layer having a uniform thickness is formed on the core end face and the slot peripheral face of the stator core by resin molding. However, particularly in the electric motor which serves as a drive source of a vehicle such as a hybrid vehicle, the diameter of the core (stator) becomes large. Thus, when combined with the fact that the thin insulating layer has a uniform thickness, it becomes difficult to appropriately fill an entire length of the core with resin.

Therefore, the invention provides a core provided with an insulating member that is formed by pouring synthetic resin and a manufacturing method of the same, wherein the synthetic resin can be poured appropriately while a slot space factor and coil insertability are secured.

Specifically, the invention provides a core provided with an insulating member, including the core having a plurality of slots, each slot formed between two teeth protruding from a yoke and having a side face and a bottom face that are formed in a generally flat shape; and the insulating member having a slot portion covering the slot and a core end face portion covering an end face of the core; wherein a core side face of the slot portion is formed in contact with the side face and the bottom face of one of the plurality of slots, a coil side face of the slot portion having two side portions and a bottom portion that are formed in a generally flat shape, and the slot portion of the insulating member has a thick portion in at least one portion that is thicker than other portions.

Furthermore, the invention provides a method of manufacturing a core provided with an insulating member, including using the core as a first die inserting a protruding portion of a second die into each slot of the core; pouring liquefied insulating resin material into a cavity, formned between the protruding portion and each slot, wherein the insulating member is formed by the resin material filling the cavity, a core side face of a slot portion of the insulating member has both side faces and a bottom face formed in a generally flat shape, a coil side face of the slot portion of the insulating member has both side faces and a bottom face formed in a generally flat shape, and the slot portion has a thick portion in at least one portion that is thicker than other portions.

Accordingly, the slot portion of the insulating member has a core side face thereof that runs along a generally linear shape of the core slot, and therefore a magnetic flux path with a large cross-sectional area can be secured without forming a notch and the like on the teeth. Furthermore, the coil side face of the slot portion is also formed in a generally flat shape, and a sufficient slot space factor and coil insertability can be secured. In addition, since the slot portion is provided with a thick portion in at least one portion, a flow path of insulating resin material during molding can be secured, and the resin material fills accurately and securely, thus allowing the insulating member to be formed in an accurate and thin shape. As a result, a space that is occupied by the insulating member can be decreased, thereby reducing the size of an electric rotating machine using the core, and also allowing improvement of reliability with respect to insulation.

In this case, the core may be a stator core or a rotor core, and also includes teeth extending in an outer radial direction as well as in an inner radial direction. Furthermore, the generally flat shape with regard to the slot of the core and the slot portion of the insulating member naturally includes a flat surface formed by a straight line, in addition to including a curve such as an arc or oval with a large curvature radius. In short, the generally flat shape includes shapes that form a substantially straight line connected by a smooth line with no sharp angles.

BRIEF DESCRIPTION OF THE DRAWINGS

Embodiments according to the invention will be described hereinafter with reference to the accompanying drawings, wherein:

FIG. 1(a) is a drawing illustrating a center cross sectional view of an entire stator core provided with an insulating member,;

FIG. 1(b) is a drawing illustrating a front elevational view of an entire stator core provided with an insulating member;

DETAILED DESCRIPTION OF PREFERRED EMBODIMENTS

Figure 2A:
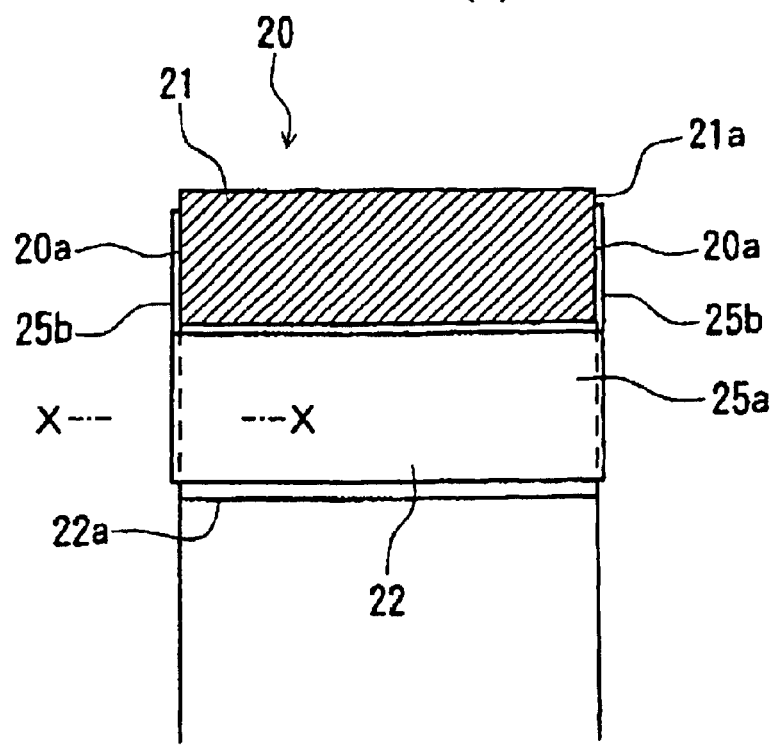
FIG. 2(a) is an enlarged cross sectional view illustrating a part of the stator core provided with the insulating memberb) is a front elevational view.
Figure 2B:
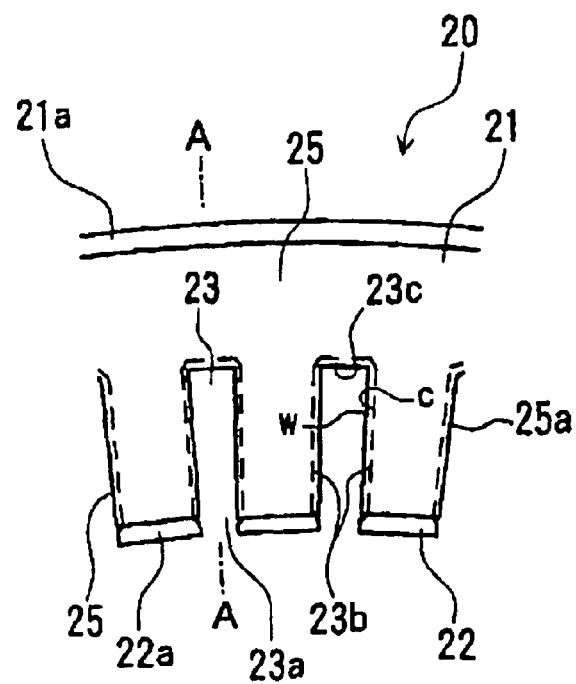
FIG. 2(b) is an enlarged front elevational view illustrating a part of the stator core provided with the insulating member.

FIGS. 1(a) and 1(b) show an entire stator core fitted with an electric insulating member according to the invention. FIGS. 2(a) and 2(b) are an enlarged view illustrating a part of such a stator core. The stator is preferably used, for example, in a motor generator of a driving system for a hybrid vehicle disclosed in Japanese Patent Laid-Open Publication No. 2001-163071. However, the application of the stator is not so limited, and the stator may be used, for example, in a generator or motor of a drive system of a hybrid vehicle disclosed in Japanese Patent Laid-Open Publication No. 2001-187535, or in electric rotating machines other than hybrid vehicles.

The stator core 20 has, in an integral form, an annular yoke 21 and a multitude of teeth 22 that protrude from the yoke in an inner radial direction at regular intervals. Between the multitude of teeth, a multitude of slots 23, an opening portion 23a of which is narrower than an inner portion (a depth side), are formed. The tooth 22 extends in such a manner that a center line in a width direction thereof is directed toward a center point of the stator core 20, and both sides of the tooth 22 extend in parallel with the center line. Therefore, the teeth 22 have a uniform width, and the slots 23 widen in a width direction from the opening portion (entrance) 23a toward the depth side.

Both side faces 23b, and a bottom face 23c of the slot 23 and both end faces 20a of the core are fitted with an electrical insulating member 25 that is integrally molded. Namely, the insulating member 25 is integrally molded by electric insulating synthetic resin and has a slot portion 25a connected with the slot 23 portion and a side face portion 25b connected with the core end face 20a portion, that is, the side end face of the tooth 22 and the inner diameter portion of the side end face of the yoke 21. More specifically, as shown in FIGS. 2(a) and 2(b), the slot portion 25a of the insulating member 25 is formed of a length such that a portion 22a of the tooth 22 at the opening 23a is exposed, and the end face portion 25a is also formed of a length such that a portion of a peripheral portion 21a of the yoke is exposed.

Figure 3A:
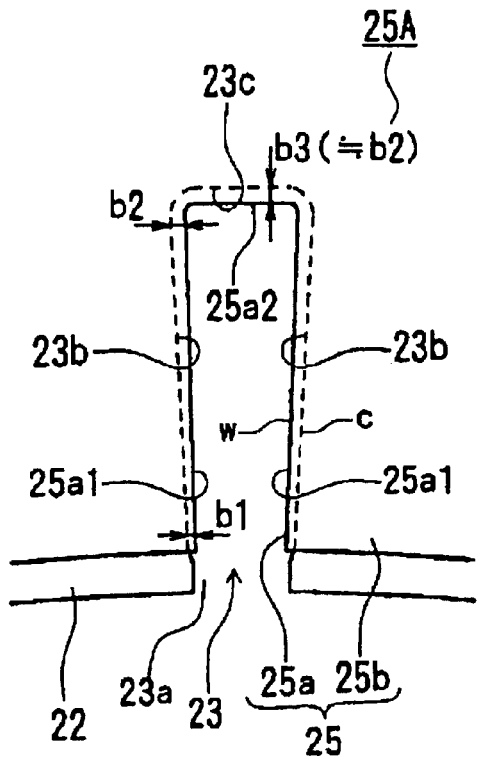
FIG. 3(a) is a front elevational view illustrating one embodiment of a slot portion of the insulating member.
Figure 3B:
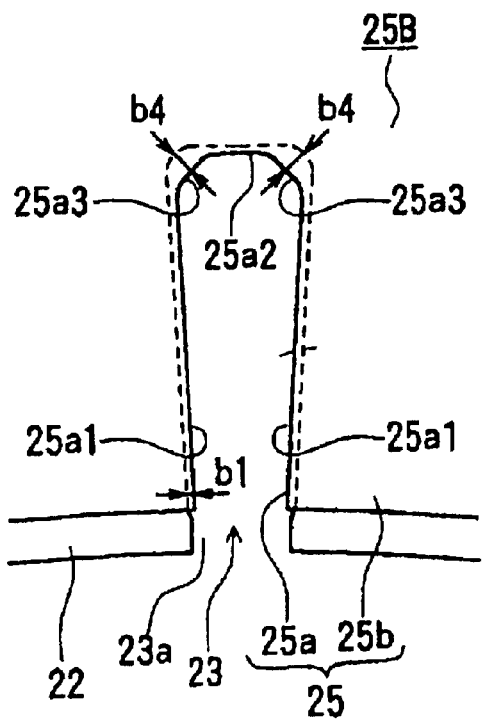
FIG. 3(b) is a front elevational view illustrating another embodiment of a slot portion of the insulating member.

Furthermore, as shown in FIGS. 3(a) and 3(b), the slot portion 25a of the insulating member 25 is formed such that a core side face c thereof is formed along the stator core 20 that constitutes the slot 23, a coil side face w is thick at least in one portion thereof, and the thickness with the inner side face w changes smoothly. That is, the core side face c runs along both side faces 23b and the bottom face 23c of the slot 23, which are formed from a linear shape, and the coil side face w consists of both side portions 25a1 and the bottom portion 25a2 formed from the linear shape.

More specifically, as shown in FIG. 3(a), the slot portion 25a of an insulating member 25A is such that the thickness of both side portions 25a1 gradually increases from the opening portion 23a toward the depth side portion (the bottom face 23c portion). That is, the thickness of both side portions 25a1 is thinnest at an opening portion b1 (e.g., 0.25 mm) and thickest at a depth side portion b2 (e.g., 0.5 mm), and the thickness changes linearly therebetween (asymptotic change). In addition, the bottom face portion 25a2 is formed of a thickness b3 generally the same ($\approx$b2) as the depth side portion b2.

Therefore, because the teeth protrude in the inner radial direction of the yoke, and the depth side of the slot is formed wider than the opening portion side by forming the thick portion at the depth side of the slot, the effect of the thick portion on the slot space factor and the coil insertability can be suppressed.

Furthermore, because the thickness of both side portions of the slot portion of the insulating member is increased gradually from the opening portion side toward the depth side, the thick portion of a predetermined range can be secured with little effect on the slot space factor and the coil insertability. Consequently, flowability of the insulating resin can be secured and uniformity of the flow can be improved, thereby enabling prevention of resin filling defects particularly at the core end face that is in contact with the yoke.

Finally, because the bottom portion is also formed with the thick portion, a flow path of insulating resin can be secured, and resin filling defects at the core end face portion can be prevented.

According to another example, as shown in FIG. 3(b), the slot portion 25a of an insulating member 25B is such that both side faces 25a1 are formed with a thin thickness b1, and corner portions 25a3 on the depth side are obliquely cut from both side portions 25a1 to the bottom face portion 25a2 so as to obtain a thickness b4. Accordingly, in both FIGS. 3(a) and 3(b), the teeth 22 have a width similar to those of conventional electric rotating machines and can secure a sufficient magnetic flux path. The slot portion 25a of the insulating member has at least in one portion thereof the thick portions b2, b3, and b4, and secures a flow path of insulating member material consisting of synthetic resin.

Therefore, because the depth side corner portion of the slot portion of the insulating member is formed with the thick portion with cut-off corners, a thick portion having a relatively large thickness can be located at a position where there is little effect on the slot space factor and coil insertability, and flowability and uniformity of the insulating resin can be secured. Consequently, an accurate and thin insulating member can be molded, and resin filling defects particularly at the core end face portion that is in contact with the yoke can be prevented.

Figure 8A:
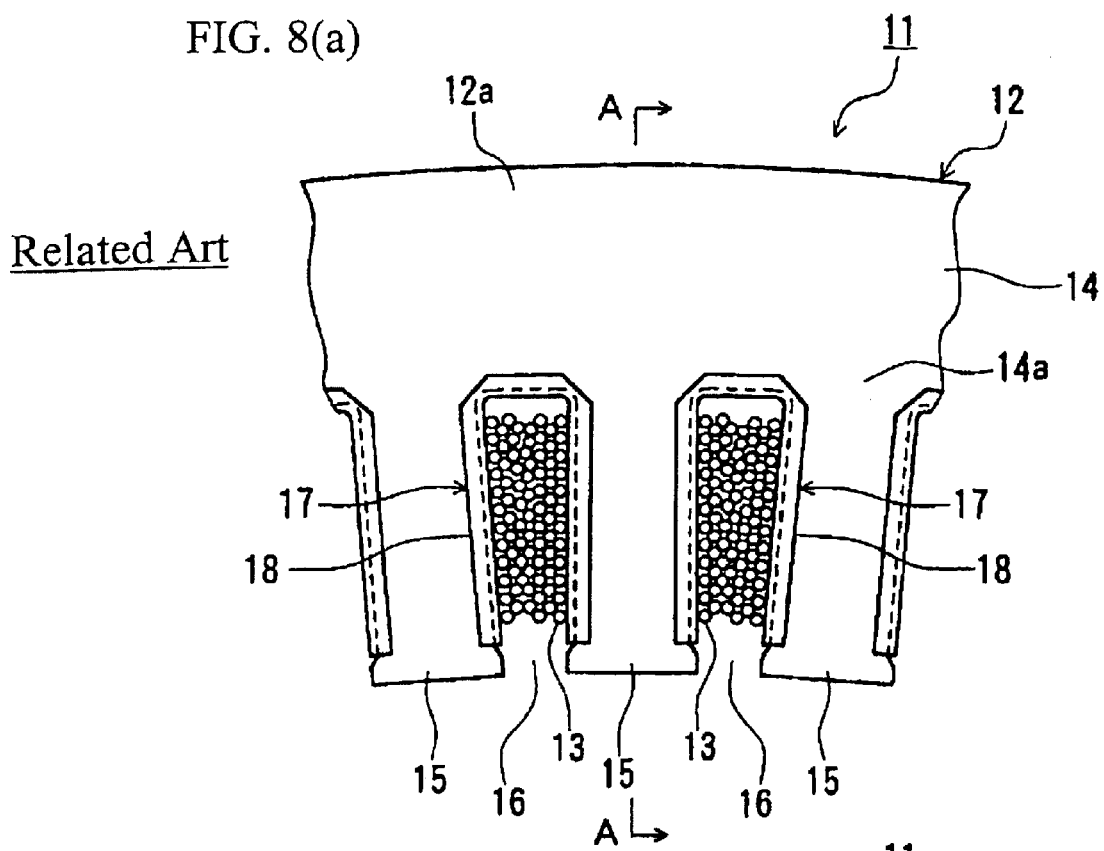
FIG. 8(a) is a drawing illustrating a front elevational view of an insulating member and a part of a core according to the related art.
Figure 8B:
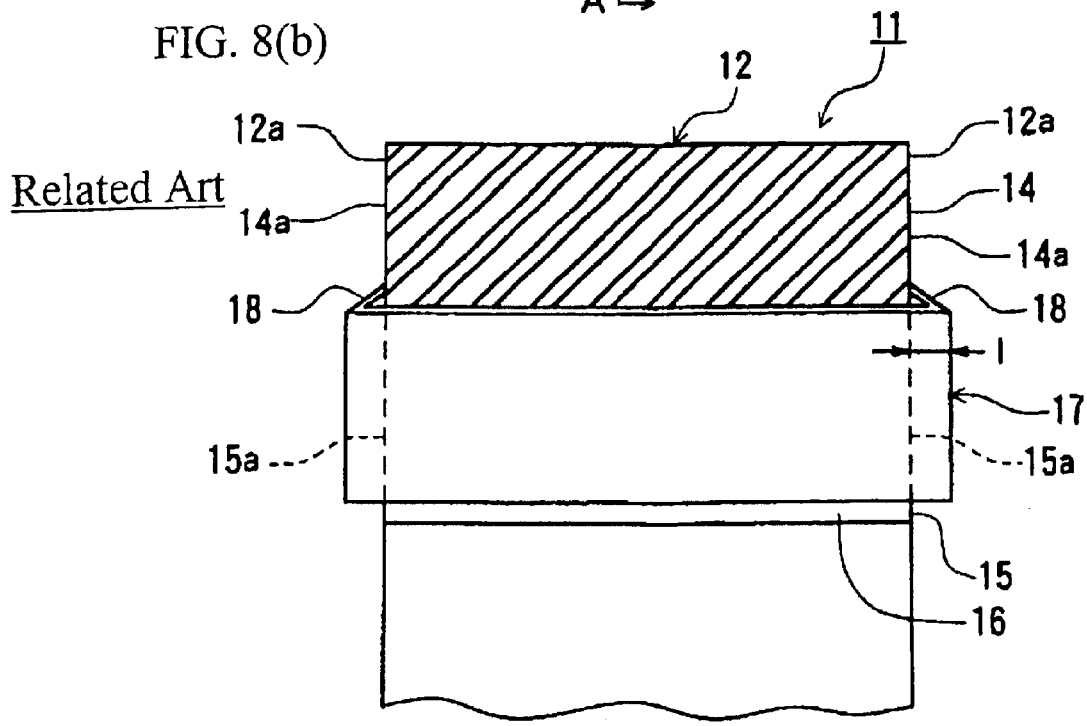
FIG. 8(b) is a drawing illustrating a cross sectional view of an insulating member and a part of a core according to the related art.

Furthermore, a coil (13; refer to FIG. 8(a)) is inserted in the slot 23. According to the embodiment shown in FIG. 3(a), even though the thickness of both side portions 25a1 of the insulating member 25 increases gradually toward the depth side due to the depth side of the slot 23 being wider than the entrance side, the depth side of the slot 23 is not narrowed thereby, and thus there is no hindrance to the insertion of the coil into the slot 23. Also, according to the embodiment in FIG. 3(b), since the depth side of the slot 23 is wider as mentioned above, the depth side corner portions of the slot 23 tend to create a clearance with the coil. Therefore, even though the depth side corner portions 25a3 of the insulating member are thick, there is no hindrance to insertion of the coil into the slot 23.

In addition, a magnet wire of a portion in contact with the ridge is protected by the corner portion, thus allowing the improvement of reliability of the electric rotating machine.

Next, a manufacturing and fitting method of the insulating member 25 will be explained with reference to FIGS. 4(a) and 4(b). As in Japanese Patent Laid-Open Publication No. 2000-125524, the stator core 20 is set within a die so that the core itself constitutes a part of the die. A cavity dA1, dA2, dB1, dB2 for the slot portion 25a is formed between the stator core 20 serving as an outer die of the die, and inner dies 30A, 30B. Further, a cavity for the end face portion 25b is formed by setting an upper die and a lower die on top and bottom faces of the stator core 20. In this case, a positioning shaft or frame is provided so as to prevent displacement of each die.

Therefore, because the insulating member is integrally molded, using the core as the die, between the core and the die having the protruding portion which is inserted in the slot, by the cavity having at least one portion thereof with a clearance wider than other portions, the resin path within the cavity is secured, and the resin is poured substantially uniformly and securely into each portion. Thus, the core provided with a relatively thin insulating member can be molded accurately and securely with the use of a simple device.

Figure 4A:
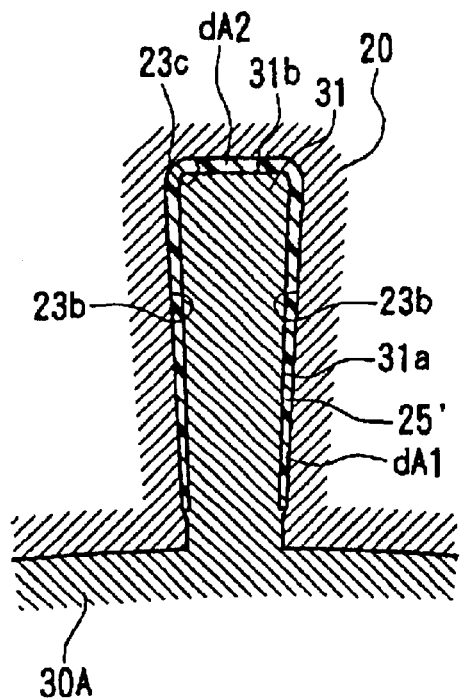
FIG. 4(a) is a drawing illustrating one embodiment of a manufacturing method of the stator core provided with the insulating member.

FIG. 4(a) is a drawing illustrating a manufacturing method of the insulating member 25A shown in FIG. 3(a). Using the stator core as an outer die, a predetermined cavity dA1, dA2 is formed between the core and the inner die 30A. The inner die 30A has a protruding portion 31 which is inserted in the slot 23 of the core 20, and the protruding portion 31 is formed such that a clearance with both side faces 23a of the slot 23 is increased gradually from an entrance portion (opening portion side) toward the depth side. Therefore, the cavity dA1, which is formed between both side portions 23b of the slot 23 and both side faces 31a of the protruding portion of the inner die, widens gradually from the entrance portion toward the depth side, and the cavity dA2, which is formed between the bottom portion 23c of the slot and a protruding portion end 31b of the inner die, consists of a clearance generally the same as the widest clearance mentioned above.

Figure 4B:
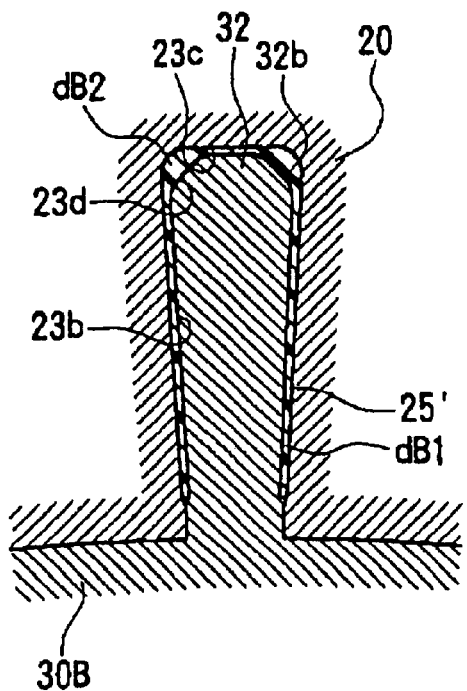
FIG. 4(b) is a drawing illustrating another embodiment of a manufacturing method of the stator core provided with the insulating member.

FIG. 4(b) is a drawing which illustrates a manufacturing method of the insulating member 25B shown in FIG. 3(b). With the same stator core 20 used as an outer die, a predetermined cavity dB1, dB2 is formed between the core and the inner die 30B. The inner die 30B has a protruding portion 32 which is inserted in the slot 23 of the core 20. The protruding portion 32 has an end corner portion 32b obliquely cut such that a clearance with both side portions 23a of the slot 23 is relatively narrow and generally uniform, and a clearance with a depth side corner portion 23d of the slot 23 becomes wide. Accordingly, the cavity dB1, which is formed between both side portions 23a of the slot and both side faces 32a of the protruding portion of the inner die, consists of a generally uniform clearance which is relatively narrow, and the cavity dB2 formed between the bottom portion 23c of the slot and the end corner portion 32b of the inner die protruding portion consists of a wide clearance.

In a state where the stator core 20 and each die including the inner die 30A or 30B are set (die clamped state), by using an injection molding machine or according to another method, insulating resin material is heated and plasticized, and liquefied resin material 25' is injected into the cavity dA1, dA2, dB1, dB2. In this case, the cavity dA1, dA2, dB1, dB2 consists of a wide clearance portion (the depth side portion and the bottom portion dA2 or the depth side corner portion dB2), and the resin material passes through the wide clearance portion, securely flows into a narrow clearance portion (the slot entrance portion dA1 or both side portions dB1) of both side portions of the slot and into a cavity between the lower die (or the upper die) and the core end face portion 25b. As a result, the resin accurately fills the cavity for the slot portion and the cavity for the core end face. That is, the liquefied resin passes through the wide cavity portions dA2 and dB2, and flows in a vertical direction and into the narrow portions dA1 and dB2 to securely fill the slot portion 25a. Also, it flows into the cavity between the core end face and the lower die (and the upper die). In this case, the cavity for the core end face consists of a wide clearance similar to the aforementioned wide portion. The resin also flows into an inner diameter annular portion of the end face of the yoke 21 and the end face portion of the tooth 22 to fill the core end face portion 25b. Accordingly, uniformity of the resin flow is secured, and resin can be poured securely and accurately into each portion of the insulating member without generating filling defects.

Then, in a state where the resin material is cooled and solidified, each die set as described above is separated (die release), and the inner dies 30A, 30B and the upper die, the lower die and the like are separated from the stator core 20. Accordingly, the insulating resin 25' filling the cavities d(A1, dA2, dB1, dB2 becomes the insulating member 25 (25A, 25B) shown in FIGS. 1(a)–3(b), and the like, which is fitted to the stator core 20. As a result, the stator core provided with the insulating member is formed.

Figure 5A:
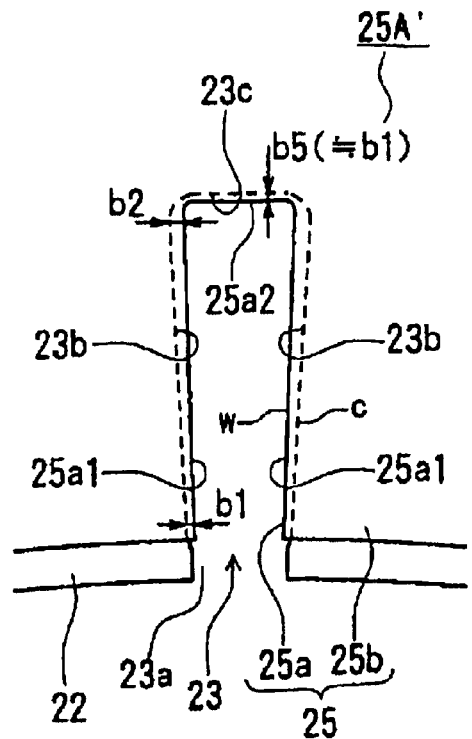
FIG. 5(a) is a drawing illustrating a front elevational view of the slot portion of the insulating member which is partially modified.

FIG. 5(a) is a drawing illustrating the embodiment in FIG. 3(a) with partial modification. As in FIG. 3(a), the thickness of both side portions 25a1 of the slot portion 25a of an insulating member 25A' increases gradually from the opening portion 23a toward the depth side portion (the bottom face 23c side). However, the bottom portion 25a2 of the slot portion 25a is different from that of FIG. 3(a) in that a thickness b5 of the bottom portion 25a2 is generally the same as the thickness b1 of the opening portion 23a of both side portions 25a1 (b5≈b1), that is, the thinnest thickness (e.g., 0.25 mm) of the side portion with a gradually increasing thickness. In this case, the thickness b5 of the bottom portion 25a2 need not necessarily be b5≈b1 as mentioned above. Any thickness b5 that is less than the thickest thickness b2 at the depth side of both side portions 25a1 (b5<b2) will suffice.

Figure 5B:
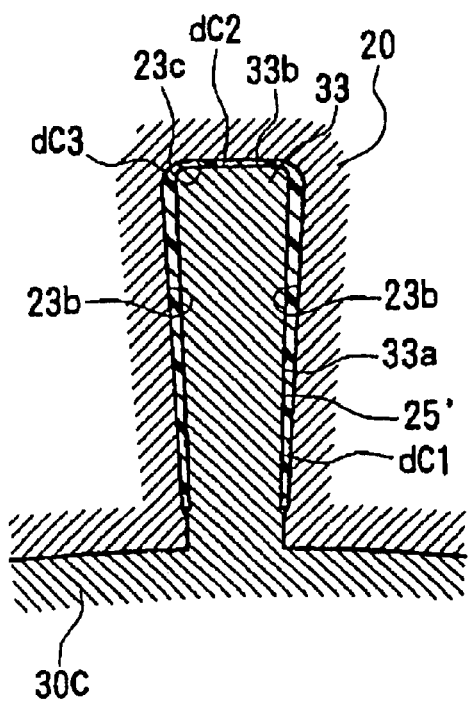
FIG. 5(b) is a drawing illustrating a manufacturing method of the slot portion of the insulating member which is partially modified.

FIG. 5(b) is a drawing illustrating a manufacturing method of the insulating member 25A'. With the stator core used as an outer die, a predetermined cavity dC1, dC2, dC3 is formed between the core and an inner die 30C. Cavities dC1, dC3 defined by both side faces 33a of a protruding portion 33 of the inner die 30C inserted in the slot 23 of the core 20 are formned, as in the case with FIG. 4(a), such that a clearance with both side faces 23b of the slot 23 widens gradually from the entrance portion (opening portion side) toward the depth side. However, this embodiment differs from the embodiment in FIGS. 3(a) and 4(a) in that the cavity dC2 between an end 33b of the protruding portion 33 and the bottom face 23c of the slot of the core consists of a clearance generally the same as the clearance at the entrance portion. Accordingly, the cavities dC1, dC3 that form the slot portion 25a1 widen gradually from the entrance portion toward the depth side, and the cavity dC3 at the depth side forms the thick portion. In addition, the cavity dC2 that forms the bottom portion 25a2 consists of a relatively narrow clearance that is generally the same as the width of the cavity dC1 at the entrance portion.

According to the embodiment in FIGS. 3(a) and 4(a), since the cavity dA2 at the bottom portion is wide, the flow speed of resin that flows through the cavity on the depth side and bottom portion of the slot becomes excessively fast depending on the type of resin material forming the insulating member, thereby filling such a cavity first. This may lead to inadequate filling of resin on the entrance side of the slot portion. However, according to the embodiment of FIGS. 5(a) and 5(b), since the cavity dC2 at the bottom portion is relatively narrow, the flow speed of resin that flows into the entrance side and the bottom portion through the wide cavity dC3 at the depth side of the slot portion is reduced, thus eliminating the possibility of inadequate filling of resin on the entrance side of the slot portion.

Figure 6A:
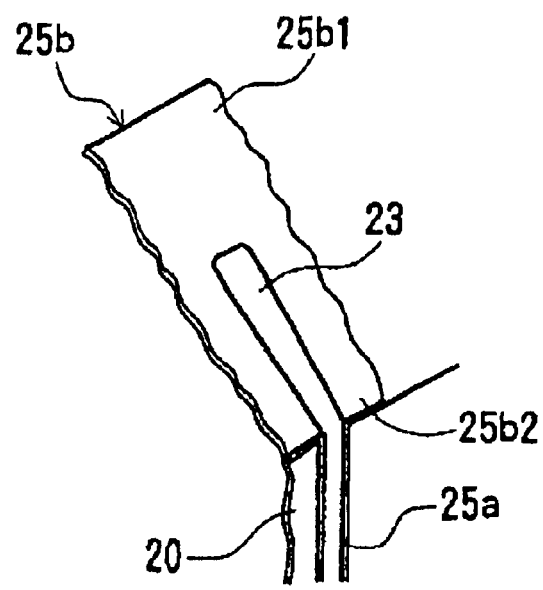
FIG. 6(a) is a drawing illustrating a perspective view of a ridge portion between a tooth and a core end portion.

FIG. 6 is a drawing illustrating a part of the core end face portion 25b of the insulating member. As shown in FIG. 6(a), a yoke 21 portion 25b1 of the core end face portion 25b extends in an annular shape, and the end face portion 25b itself is formed thick. Also, resin quickly flows into the yoke portion 25b1 through the wide cavity portions dA2, dB2, and dC3 as described in FIGS. 4(a), 4(b), and 5(b), so that the resin flows generally evenly into the yoke 21 portion 25b1 and the tooth 22 portion 25b2. Furthermore, as shown in FIG. 5(b), if a corner portion R on a ridge g portion between the tooth 22 and the core end face 20a is formed with uniform thickness, the corner portion R of the insulating member becomes thin, which may causes defective insulation when inserting a magnet wire into the slot and the like.

Figure 6B:
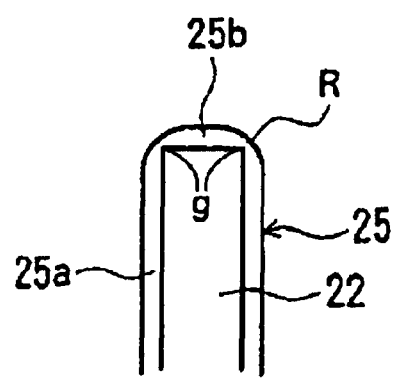
FIG. 6(b) is a drawing illustrating an end face view taken along a line X—X in FIG. 2(a)
Figure 7A:
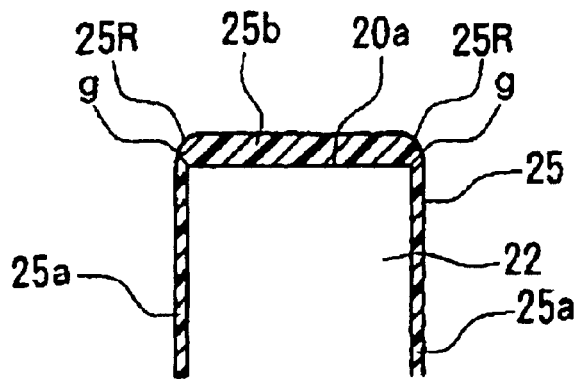
FIG. 7(a) is a drawing illustrating an end face taken along the line X—X in FIG. 2(a), showing a corner portion of the insulating member at a ridge portion between the tooth and the core end face.

FIGS. 7(a), 7(b), 7(c), and 7(d), similar to FIG. 6(b), is a cross-sectional view of the teeth 22 portion taken along a line X—X in FIG. 2. As shown in FIG. 7(a), the insulating member 25 on the ridge portion g between the tooth 22 and the core end face 20a is provided with a corner portion 25R of a chamfer shape or a rounded shape having a curvature radius larger than the thickness of the insulating member 25 by offsetting the center of curvature from the ridge toward a tooth inward direction. The insulating member 25b of the core end face portion is connected to the insulating member 25a of the slot portion through the corner portion 25R, and is formed a predetermined thickness greater than the slot portion. Consequently, a magnet wire when inserted into the slots 23 sandwiching the teeth 22, or a connecting portion of the slot portion and the coil end portion of the magnet wire, comes into contact with the large-radius corner portion 25R, thereby enabling protection of the magnet wire.

Figure 7B:
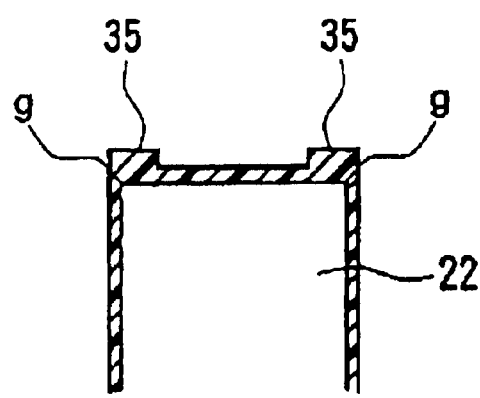
FIG. 7(b) is a drawing illustrating an end face taken along the line X—X in FIG. 2(a), showing one embodiment of the die molding and the corner portion.
Figure 7C:
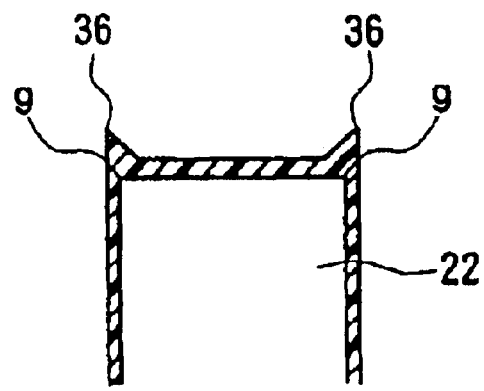
FIG. 7(c) is a drawing illustrating an end face taken along the line X—X in FIG. 2(a), showing another embodiment of the die molding and the corner portion.

The corner portion 25R may be molded by upper and lower dies that are designed to correspond to the corner portion when molding the insulating member by injection molding or the like as described above. However, it is preferable to perform molding as follows in order to simplify the die structure. A part of the upper and lower dies that corresponds to the ridge portion g between the tooth 22 and the core end face 20a is formed in a stepped flat shape or a recessed shape having a trapezoidal cross section. Accordingly, when the insulating member is molded by injection molding or the like using the die, the insulating member corner portion 25R is molded so as to protrude in a rectangular cross-sectional shape 35 as shown in FIG. 7(b) or a triangular cross-sectional shape 36 as shown in FIG. 7(c). In this state, a heated roller or die is pressed against the thick portion of the protruding rectangular cross-sectional shape or triangular cross-sectional shape, such that the corner portion 25R is molded in a chamfer shape or a rounded shape having a large curvature radius as explained above.

As a result, the resin material can securely fill the core end face portion 25b from the rectangular or triangular cross-sectional shape portions 35, 36 having a wide cross-sectional area during the flow of insulating resin material by injection molding or the like, as well as due to the wide cavities dA2, dB2, and dC3 of the slot portion.

Figure 7D:
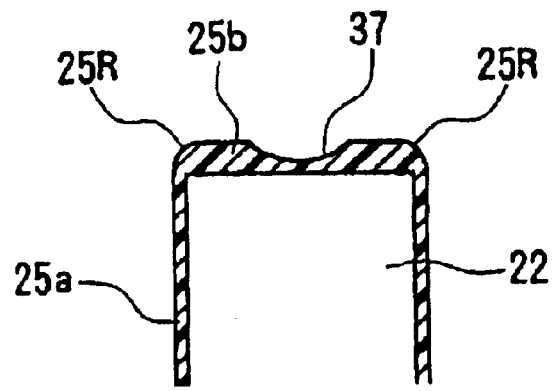
FIG. 7(d) is a drawing illustrating an end face taken along the line X—X in FIG. 2(a), showing the corner portion according to a different embodiment.

Furthermore, when the cross-sectional area of the protruding cross-sectional shapes 35, 36 is large, the core end face portion 25b is formed with uniform thickness continuing from the corner portion 25R as shown in FIG. 7(a). When the cross-sectional area is small, the core end face 25b of the insulating member is formed in a shape where the center part of the tooth 22 is recessed as shown in FIG. 7(d). A recessed portion 37 allows a reduction in the amount of the insulating resin material used, without impairing the magnet wire protection function of the corner portion 25R mentioned above.

Finally, a corner portion of one core end face 20a may be molded in a heating and pressurizing process using the heated roller or the like as described earlier, while a corner portion of the other core end face may be molded by directly filling the cavity formed in the upper die with resin.

It will be readily apparent to those skilled in the art that various modifications of the above-described embodiments and additional embodiments are within the scope of the disclosed invention.

What is claimed is:

1. A core provided with an insulating member, comprising the core having a plurality of slots, each slot formed between two teeth protruding from a yoke and having a side face and a bottom face that are formed in a generally flat shape; and
the insulating member having a slot portion covering the slot and a core end face portion covering an end face of the core; wherein
a core side face of the slot portion is formed in contact with the side face and the bottom face of one of the plurality of slots, a coil side face of the slot portion having two side portions and a bottom portion that are formed in a generally flat shape, and the slot portion of the insulating member has a thick portion in at least one portion that is thicker than other portions.

2. The core provided with the insulating member according to claim 1, wherein
the insulating member is made of integrally formed synthetic resin and is integrally fitted to the core.

3. The core provided with the insulating member according to claim 1, wherein
the core is a stator core, each slot has a depth side that is wider than an opening side, and each slot is formed between two teeth protruding from the yoke in an inner radial direction.

4. The core provided with the insulating member according to claim 1, wherein each of the pulurality of slot portions of the insulating member is formed such that a thickness of both side portions gradually increases from an opening side of the slot toward a depth side of the slot.

5. The core provided with the insulating member according to claim 4, wherein
that the bottom portion of each slot portion of the insulating member is generally the same thickness as a thickness of a depth side end of both side portions of the insulating member.

6. The core provided with the insulating member according to claim 4, wherein
the bottom portion of each slot portion of the insulating member is thinner than a thickness of a depth side end of both side portions of the insulating member.

7. The core provided with the insulating member according to claim 1, wherein
the thick portion is a depth side corner portion, formed by the intersection of one side portion and the depth portion such that a depth side corner of a resulting space within each slot is cut off.

8. The core provided with the insulating member according to claim 1, wherein
the thick portion of each slot portion of the insulating member continues from one core end face to the other core end face.

9. The core provided with the insulating member according to claim 1, wherein
a ridge portion between each tooth and the core end face of the insulating member forms a corner portion with a chamfer shape or a rounded shape having a curvature radius larger than a radius with the ridge portion as a center.

10. The core provided with the insulating member according to claim 9, wherein
the core end face portion of the insulating member is formed in a recessed shape such that a center portion in a width direction of the tooth is thinner than the corner portion.

11. A method of manufacturing a core provided with an insulating member, comprising:
using the core as a first die;
inserting a protruding portion of a second die into each slot of the core;
pouring liquefied insulating resin material into a cavity, formed between the protruding portion and each slot, wherein
the insulating member is formed by the resin material filling the cavity, a core side face of a slot portion of the insulating member has both side faces and a bottom face formed in a generally flat shape, a coil side face of the slot portion of the insulating member has both side faces and a bottom face formed in a generally flat shape, and the slot portion has a thick portion in at least one portion that is thicker than other portions.

12. The method of manufacturing the core provided with the insulating member according to claim 11, wherein
the second die, has a recessed portion in which a portion corresponding to a ridge between a tooth and a core end face is wide, further comprising:
forming a thick portion on a core end face portion corresponding to the recessed portion by pouring the liquefied insulating resin material in the cavity, and
heating and pressing the thick portion such that the ridge portion forms a corner portion of a chamfer shape or a rounded shape having a curvature radius larger than a radius with the ridge portion as a center.

13. The method of manufacturing the core provided with the insulating member according to claim 11, wherein the cavity is formed, with the protruding portion of the second die opposing a core end face, by a ridge portion between a tooth and the core end face, the cavity corresponding to a corner portion of a chamfer shape or a rounded shape having a curvature radius larger than a radius with the ridge portion as a center, and the corner portion is molded by pouring the liquefied insulating resin material in the cavity.

14. The method of manufacturing the core provided with the insulating member according to claim 11, further comprising:

forming a first portion of the cavity, having a recessed portion in which a portion corresponding to a ridge between a tooth and the core end face is wide;

forming a second portion of the cavity adjacent to the first portion of the cavity and between the core and the second die, the second cavity corresponding to a corner portion of the slot and comprising a chamfer shape or a rounded shape having a curvature radius larger than a radius with the ridge portion as a center;

forming a thick portion on a core end face portion corresponding to the recessed portion of the first cavity portion by pouring the liquefied insulating resin material in the first portion of the cavity;

heating and pressing the thick portion to mold the corner portion on the one core end face; and molding the corner portion on the other core end face by pouring the liquefied insulating resin material in the second cavity.

15. The method of claim 11, further comprising forming a cavity between the core and the second die, the cavity having at least one portion thereof with a clearance wider than the other portions.

* * * * *